Dec. 22, 1953   O. D. CALDWELL   2,663,375
PORTABLE RIG MOUNT
Filed Feb. 24, 1950   6 Sheets-Sheet 1
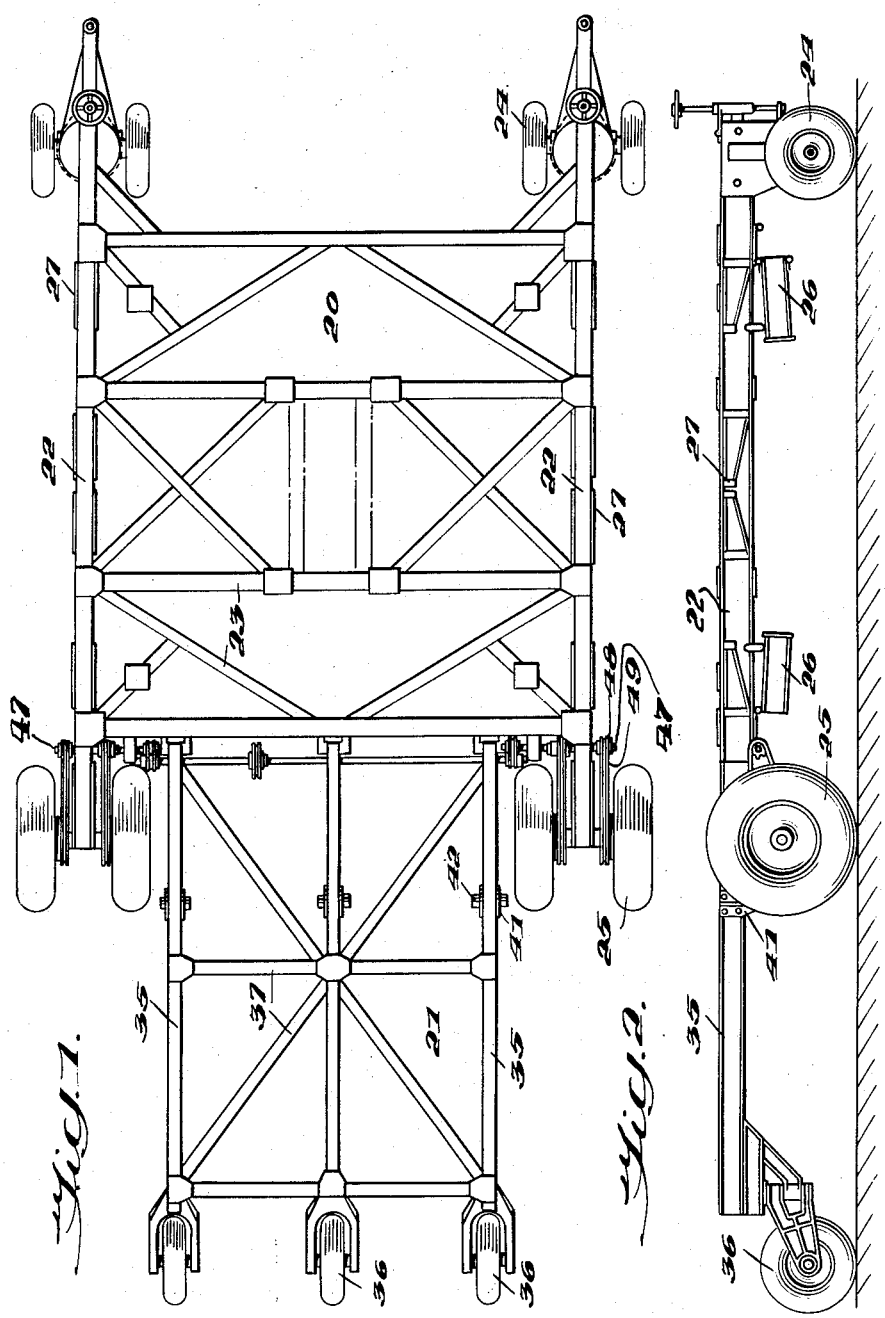
INVENTOR.
OSCAR D. CALDWELL,
BY
ATTORNEY

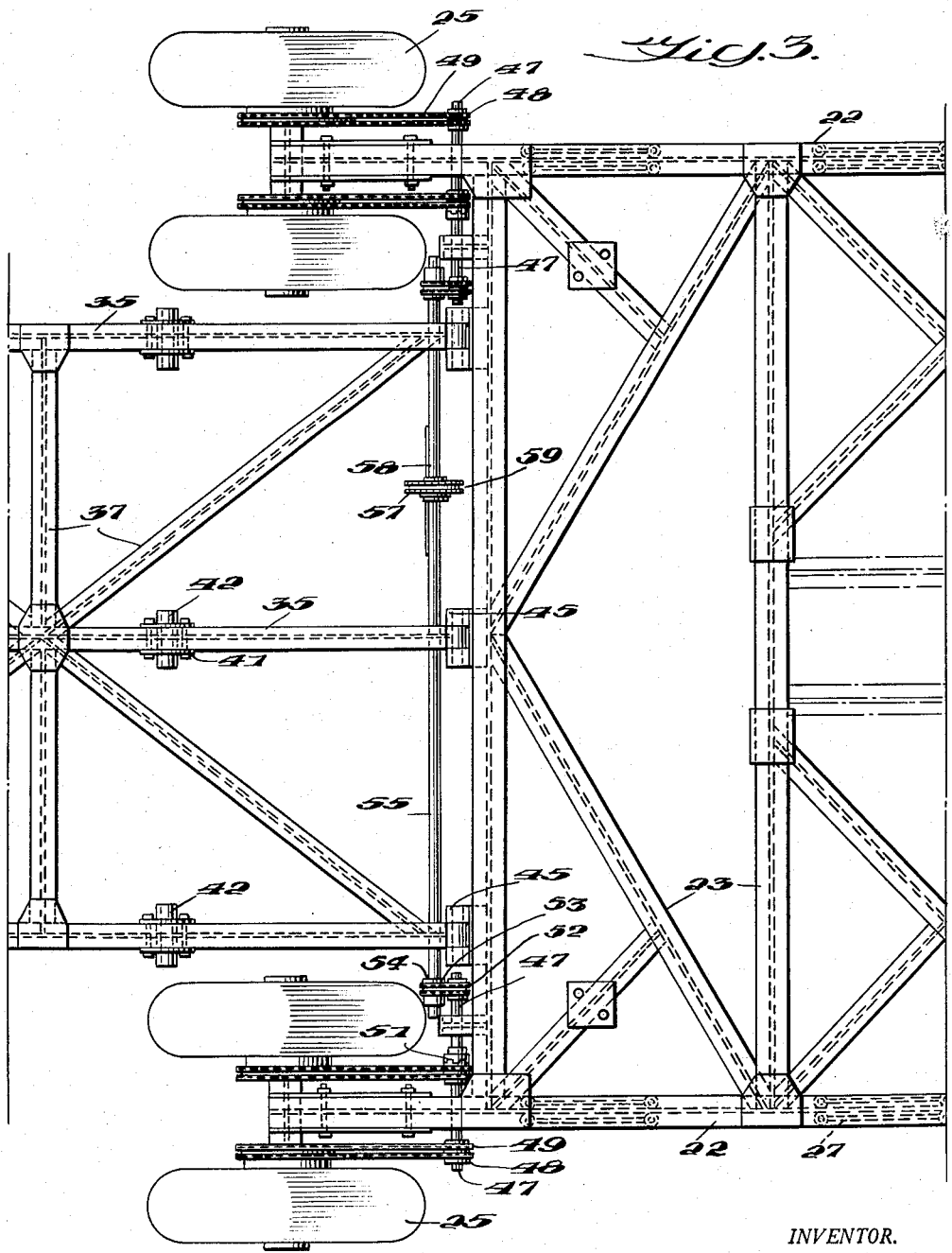

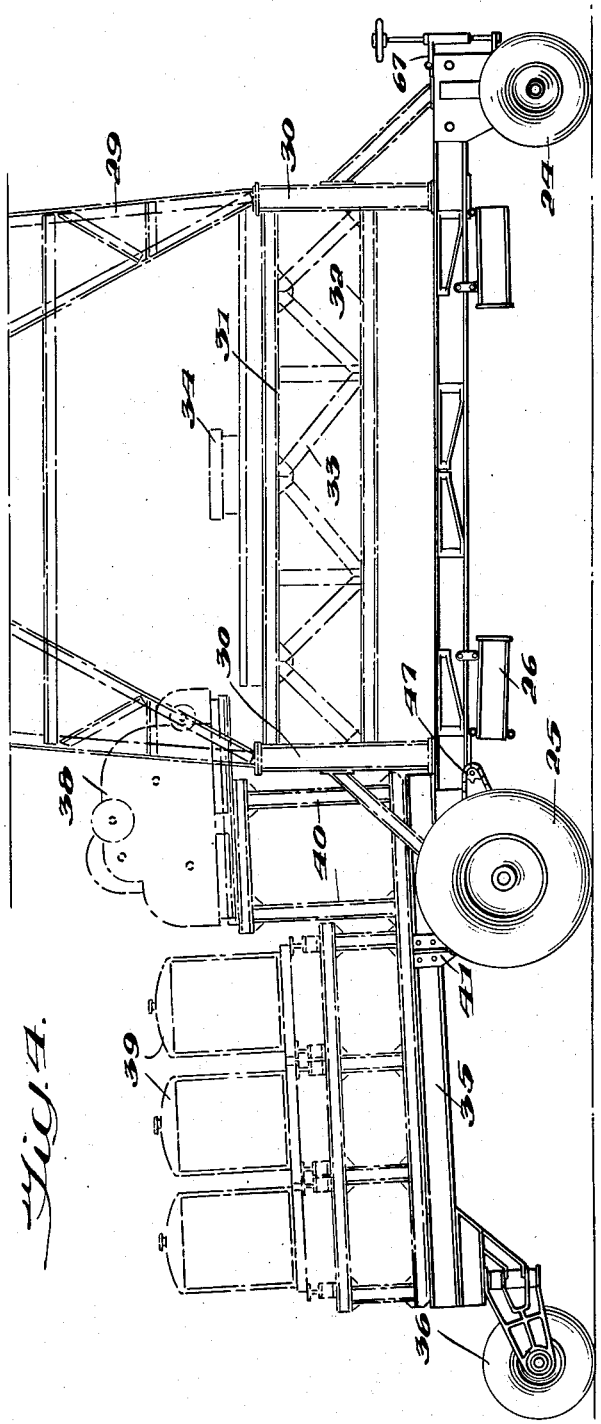

Dec. 22, 1953     O. D. CALDWELL     2,663,375
PORTABLE RIG MOUNT
Filed Feb. 24, 1950     6 Sheets-Sheet 4
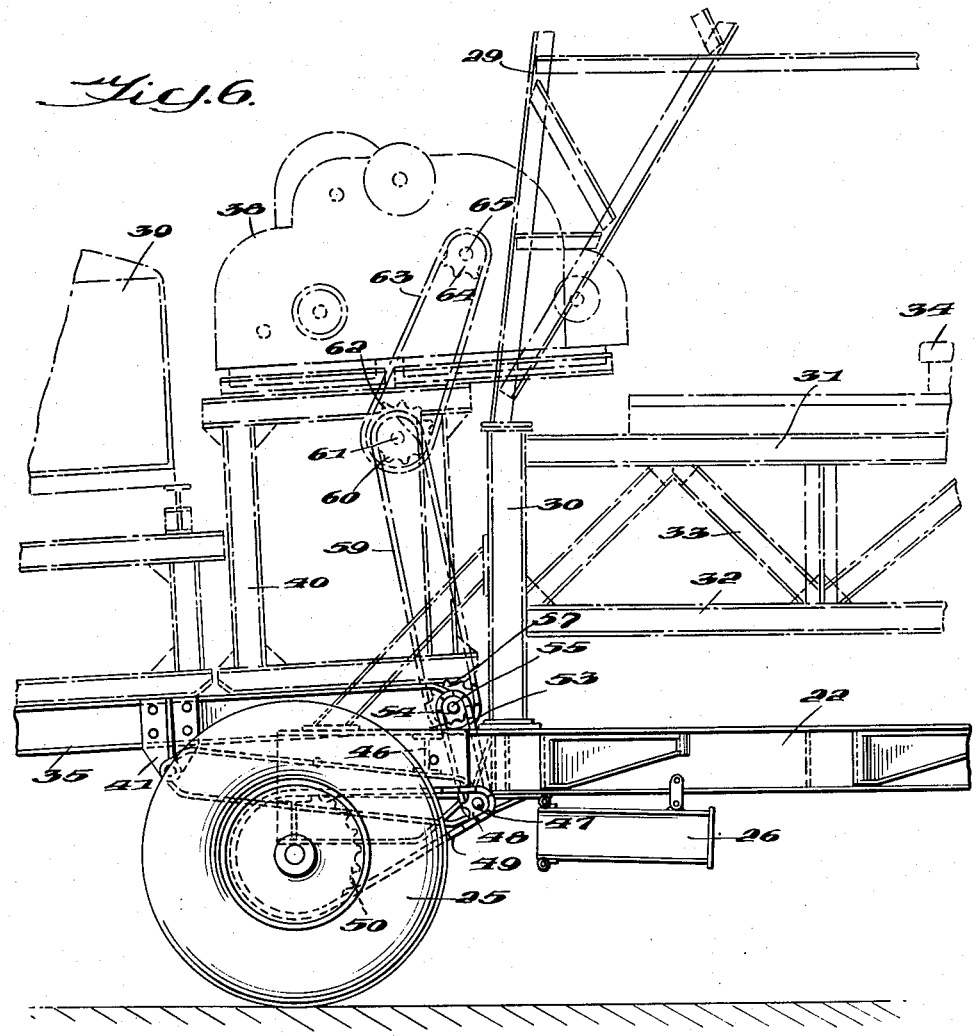
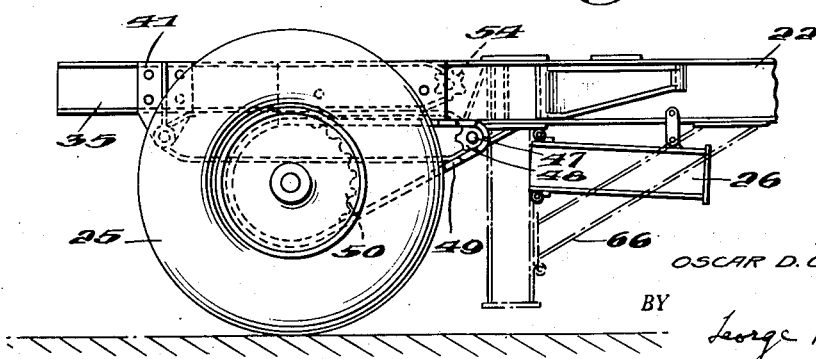
INVENTOR.
OSCAR D. CALDWELL,
BY
ATTORNEY Dec. 22, 1953  O. D. CALDWELL  2,663,375
PORTABLE RIG MOUNT
Filed Feb. 24, 1950  6 Sheets-Sheet 5
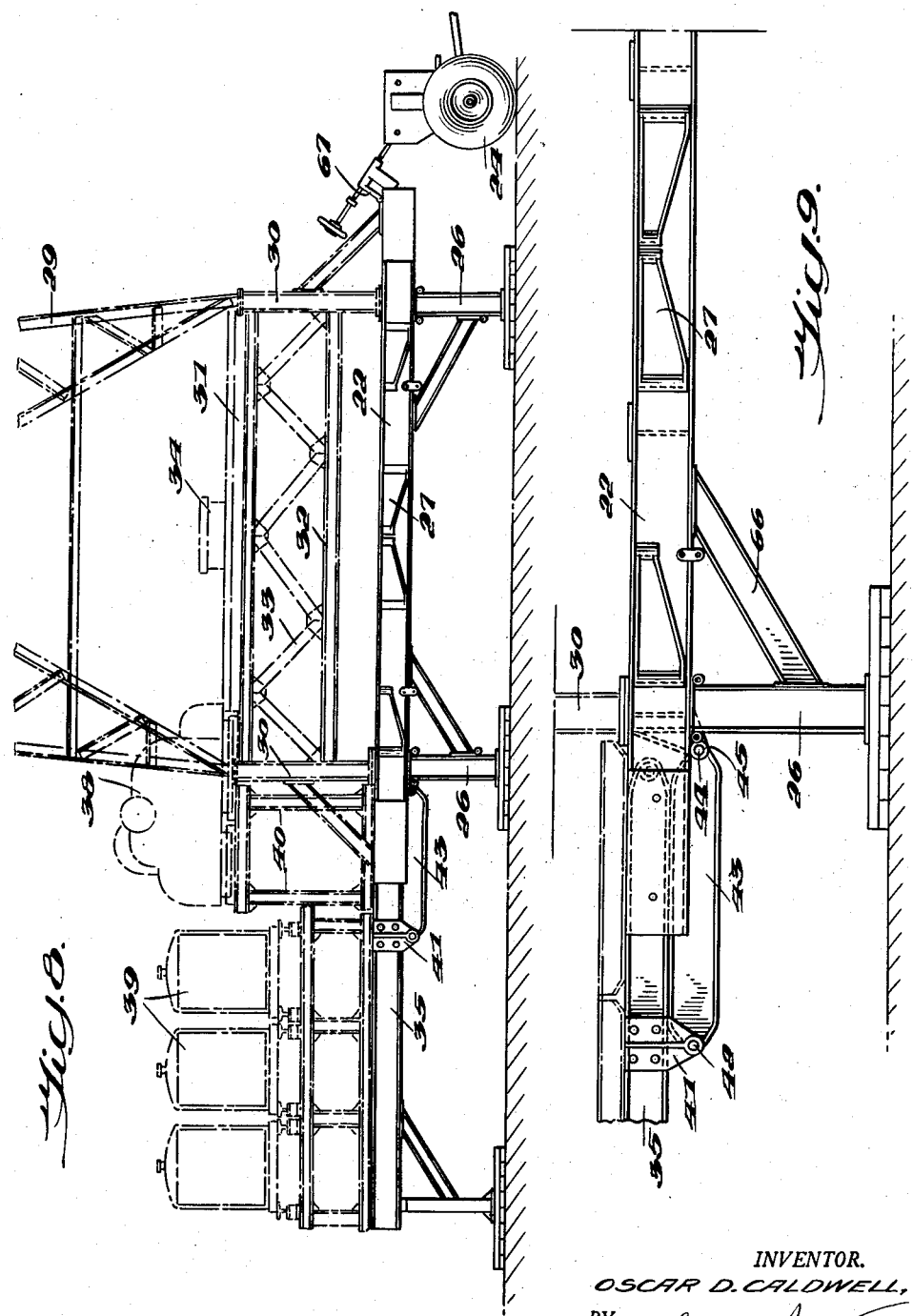
INVENTOR.
OSCAR D. CALDWELL,
BY
George Rex Frye.
ATTORNEY Dec. 22, 1953  O. D. CALDWELL  2,663,375
PORTABLE RIG MOUNT
Filed Feb. 24, 1950  6 Sheets-Sheet 6
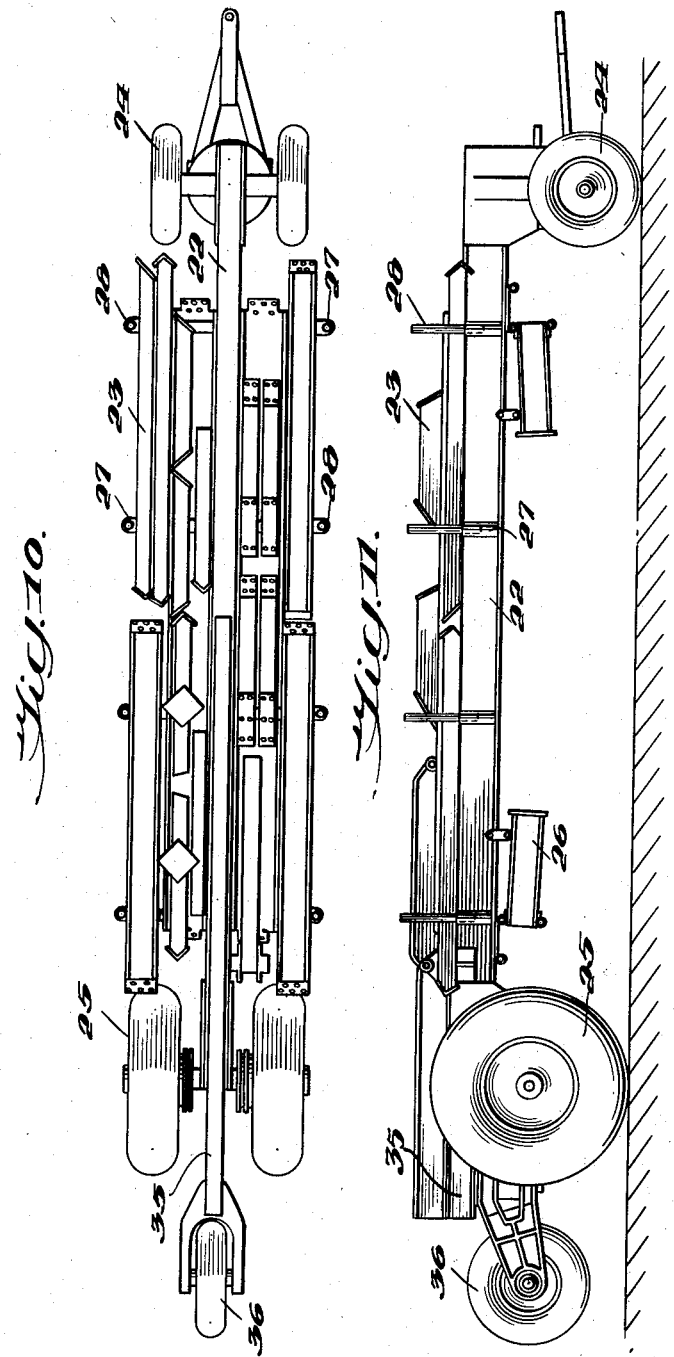
INVENTOR.
OSCAR D. CALDWELL,
BY George Rex Frye.
ATTORNEY Patented Dec. 22, 1953

2,663,375

UNITED STATES PATENT OFFICE 2,663,375

PORTABLE RIG MOUNT

Oscar D. Caldwell, Oklahoma City, Okla., assignor of one-half to H. A. Kyle, Oklahoma City, Okla.

Application February 24, 1950, Serial No. 146,071

4 Claims. (Cl. 180—14)

This invention relates to portable derrick equipment for drilling or servicing oil and gas wells, and has for its primary object the provision of a drilling or servicing unit which will allow the use of conventional drilling apparatus and methods, and which may be transported for relatively short distances between drilling locations without the necessity of disassembly.

Another object of the invention is the arrangement of a portable drilling or servicing unit that may readily be disassembled whenever it is desired to move the unit over relatively long distances, the rig mount being divisible into a plurality of separately towable elements arranged to support other portions of the unit thereupon in stockpile relation during such long trips.

A further object of this invention is the provision of a carriage member capable of supporting an oil field derrick, derrick floor and substructure, and a trailer member pivotally connected to the carriage member and capable of supporting the draw works, power units and other associated parts, in positions whereby power therefrom may conveniently be utilized either for operating the drilling and well servicing mechanisms or for moving the entire rig mount from place to place while such mechanisms are supported thereon.

A further object of this invention is the connection of the trailer member to the carriage member by a plurality of hinge-points arranged in horizontal alignment with the axes of the drive shafts for turning the drive wheels of the carriage from power units mounted on the trailer, whereby constant distances between sprockets may be maintained despite relative swinging movements between trailer and carriage members.

A further object of the invention is the provision of means for changing the height of the forward portion of the trailer floor at will, to thereby raise mechanisms supported on the trailer, as the draw works, to desired positions above the derrick floor supported on the carriage member, allowing flexibility of operation and safe transportation of the entire assembly over relatively short distances.

A further object of this invention is the provision of a rig mount including a plurality of spaced longitudinal beams each carrying supporting and steering wheels adjacent its extremities, whereby each may form a separate vehicle, said beams being connected together by detachable cross-members when forming a support for an oil well derrick and associated mechanisms and also being provided with foldable brackets or outriggers for supporting such disassembled cross-members and portions of an associated trailer, derrick, etc., when forming individual vehicles for transporting the rig mount and associated mechanisms over relatively long distances.

A further object is the provision of portable derrick equipment designed for full service in connection with wells, both completed and in course of completion, and capable of being used as a movable pipe rack, hoisting apparatus, etc. Suitable jacks may be arranged on each mount leg for the purpose of levelling the mount and derrick, and the rig mount may be rendered portable by the use of pontoons or barges, as well as by wheels as herein shown.

Other objects and advantages will be apparent from the following description, wherein reference is made to the accompanying drawings illustrating a presently preferred embodiment of my invention and wherein similar reference numerals designate similar parts throughout the several views.

In the drawings:

Fig. 1 is a plan view of my improved portable rig mount assembled to support an oil field derrick and associated mechanisms during transportation over relatively short distances.

Fig. 2 is a side elevation thereof.

Fig. 3 is an enlarged plan view showing the rear portion of the carriage proper and the front portion of the trailer hingedly connected to the carriage on the same axis as the main drive sprocket wheels through which the carriage may be driven when desired.

Fig. 4 is a side elevation of the rig carriage member and trailer with a derrick and associated mechanisms mounted thereon in position for relatively short transport movements.

Fig. 5 is an enlarged detail side elevation of a shackle link connection whereby the trailer floor level may be raised or lowered without changing the axis of the hinged connection between trailer and carriage member.

Fig. 6 is an enlarged side view showing the rear portion of the carriage member and the front portion of the trailer with its floor level raised above that of the carriage member, with drive mechanism arranged for driving the rig mount.

Fig. 7 is a detail side elevation showing the shackle link position when the floor levels of the carriage member and trailer are in the same horizontal plane.

Fig. 8 is a side elevation showing the rig mount in drilling position with most of the wheels removed and the legs positioned to stationarily support the mount.

Fig. 9 is an enlarged detail side elevation of the rear portion of the carriage and front portion of the trailer when in the stationary positions of Fig. 8.

Fig. 10 is a plan view, and Fig. 11 a side elevation of one of the two towable units into which my improved rig mount divides for transport over relatively long distances, outrigger supports being swung to each side of the longitudinal beams to provide rests for the dismantled portions of the carriage member and trailer.

Referring now to the drawings, the numeral 20 designates a carriage member forming the forward portion of my improved portable rig mount, and 21 a trailer member hingedly connected to the carriage member as hereinafter more fully described. Carriage member 20 is constructed of a plurality of steel beams 22 arranged longitudinally of the rig mount and connected together by demountable reinforced cross-members 23 when the carriage member is used to support a well derrick or the like. Each longitudinal beam 22 is shown in Figs. 1 and 2 as supported upon front wheels 24 and rear wheels 25, the front wheels being mounted in a manner enabling their use for steering purposes when desired, and the rear wheels being associated with suitable driving mechanism to enable their use for propelling purposes when desired. To the underside of beams 22 are hinged a plurality of legs 26 adapted to stationarily support the rig mount when swung downward to substantially the positions shown in Figs. 8 and 9, but which are held in raised positions, substantially as shown in Figs. 2 and 6, while the rig mount is resting upon wheels 24 and 25. Folding brackets 27 of the outrigger type are pivotally mounted at the sides of longitudinal beams 22, as best shown in Figs. 9–11, and adjacent their free ends these brackets 27 are apertured to receive removable posts 28 (Fig. 11) to form lateral restraints for dismantled portions of cross-members 23 or the like while supported upon the outswung brackets 27. (Figs. 10 and 11.) Normally the brackets 27 are infolded closely against the sides of beams 22, substantially as shown in Figs. 1 and 3.

The carriage member 20, with its longitudinal beams 22 and reinforced cross-members 23, is dimensioned to support any desired size of oil well derrick with its floor, substructure, and attendant supports for casing, kelly, etc. Conventional oil well drilling derricks are 24′ x 24′ x 122′ with a 50 ton capacity, 30′ x 30′ x 155′ with an 80 ton capacity and 42′ x 42′ x 170′ with a 100 ton capacity, and any of these may be carried on my rig mount. The derrick 29 is preferably secured upon the carriage member 20 substantially as shown in Figs. 4, 6 and 8, with corner posts 30 contacting the beams 22 above the positions assumed by legs 26 when downswung to support the rig mount (Fig. 8). The derrick angle irons are carried upon shoes bolted to the tops of corner posts 30 and the derrick floor 31 and substructure 32 are supported upon intermediate portions of corner posts 30. Reinforcing struts 33 may be arranged between the derrick floor 31 and substructure 32 in conventional or any desired manner. A rotary 34 may be carried by the derrick floor 31, and the reinforcements for the cross-beams 23 are so spaced upon carriage 20 (Fig. 1) as to clear the casing, drilling mechanism, etc., extending downwardly below the rotary 34 while adequately bracing the rig mount.

The trailer member 21 is formed with a plurality of spaced longitudinal beams 35 carrying caster wheels 36 adjacent their rear extremities (Figs. 1 and 2) and pivotally connected adjacent their forward extremities to the carriage member 20 (Fig. 3). Suitable reinforcements 37, such as cross and diagonal braces, are employed to connect together the longitudinal beams 35 and provide an adequate support for a draw works 38 and a plurality of power units 39 (Figs. 4, 6 and 8). The draw works 38 is preferably supported upon a skeleton foundation 40 of sufficient height to permit the base of the draw works to extend above the plane of the derrick floor 31 (Figs. 4 and 6) or substantially align with the derrick floor (Fig. 8).

The manner of pivotally connecting the trailer member 21 to the carriage member 20 is best shown in Figs. 3–7. Each longitudinal beam 35 of the trailer carries near its forward end a pair of depending brackets 41 forming spaced journal bearings for a pivot bolt 42 on which is mounted the rear extremity of a shackle link 43, the forward extremity of which is journalled upon a pivot bolt 44 mounted in spaced bearing brackets 45 extending rearwardly from the carriage 20. The axes of the pivot bolts 44 are in horizontal and vertical alignment with the axes of the drive shafts 47 at each side of carriage member 20 (Figs. 3 and 7) whereby the rear wheels 25 are driven from draw works 38, and such alignment is maintained regardless of the position of the trailer beams 35 and supported elements with respect to the carriage 20 and the derrick floor supported thereby. As shown in Figs. 4–6, the base of the draw works 38 may be swung to positions above derrick floor 31 by inserting spacers 46 between shackle links 43 and the undersides of trailer beams 35, thereby securing a flexibility of the rig mount enabling transportation of the assembled well drilling and servicing apparatus over ordinary terrain without danger of rubbing or bumping of apparatus supported by the trailer against adjacent elements supported on the carriage member.

When spacers 46 are removed from between shackle links 43 and trailer beams 35, the trailer beams again rest upon the upper faces of the shackle links (Figs. 7–9) and the base of the draw works 38 substantially aligns with the derrick floor 31 for convenient operation of well drilling or servicing apparatus from the draw works.

Conventional or any desired arrangements may be utilized for operating well drilling and/or servicing apparatus from draw works 38, and it is believed to be unnecessary to illustrate same herein. A presently preferred arrangement for utilizing the draw works 38 for moving the rig mount and assembled apparatus is shown in Figs. 3 and 6. Sprockets 48 mounted on drive shafts 47 are connected by chains 49 with sprockets 50 carried by drive wheels 25, with suitable clutches 51 arranged to actuate sprockets 48 only when desired.

Also mounted on drive shafts 47 adjacent their inner extremities are sprockets 52 (Fig. 3) connected by chains 53 with sprockets 54 fixed upon the elongated cross-shaft 55 journalled in bearings 56 in the forward portions of trailer beams 35 (Fig. 5). Cross-shaft 55 is in turn connected to be driven from the draw-works 38 through a sprocket 57 adjustably mounted, as by a keyway 58 on shaft 55 (Fig. 3), a chain 59 passing over sprocket 57 and an upper sprocket 60 mounted upon a stub shaft 61 suitably journalled in the skeleton foundation 40 below the draw-works 38 (Fig. 6). Also mounted upon stub shaft 61 is a larger sprocket 62 which is connected by chain 63 with sprocket 64 fixed on a power take-off shaft 65 of the draw-works. Adjustable sprocket 57 may be slid along cross-shaft 55 to align with sprocket 60 whenever required, and suitable provision may be made for adjusting the lengths of chains 53 and 59 for correctly meshing with their respective sprockets regardless of the position of cross-shaft 55 with respect to the floor of the carriage member 20. Swinging movements of the cross-shaft 55 when the forward extremities of trailer beams 35 are raised or lowered through changes in position of spacers 46 will not affect the positions of drive shafts 47 and their sprockets 48, for such drive shafts are permanently aligned with the forward hinge-points of the shackle links 43 and the trailer beams 35 fulcrum upon the rearward hinge points of such shackle links (Figs. 5-7). Chains 53, 59 and 63 (Fig. 6) may be removed when the rig is to remain in stationary position, and the well drilling and/or servicing mechanism driven from the power take-off shaft of the draw-works in conventional manner without turning the sprockets and shafts of the above-described mechanism for moving the rig mount.

When the rig mount is positioned where it is desired to use the derrick for drilling or well servicing operations, the weight of the carriage 20, trailer 21 and the devices supported thereon is preferably removed from the wheels 24, 25, and 36, substantially as shown in Fig. 8. The legs 26 are swung into vertical positions below beams 22 and are supported in their downswung positions by proper brackets 66 (Figs. 7 and 9). If desired, suitable planking or other suitable foundation material may be arranged on the ground in position to be contacted by the feet 26. Wheels 25 and 36 are usually entirely removed from the rig mount while the well drilling and/or servicing is being performed, but the steering wheels 24 are preferably connected to the carriage member 20 by a bracket 67 pivoted at its rear extremity to the carriage member. This arrangement permits the front or steering wheels 24 to be moved forwardly to substantially the positions shown in Figure 8, where they are relieved from supporting the weight of the carriage, derrick, etc. while still attached to the carriage.

After the drilling or servicing operations have been completed at one location, the wheels are replaced upon carriage and trailer to substantially the positions shown in Fig. 1, and the feet 26 swung upwardly away from the ground. Chains 49, 53 and 63 are then repositioned around their respective sprockets to complete the connections between the draw-works 38 and the drive wheels 25. Preferably the draw-works is swung upwardly out of engagement with the derrick floor 31 or other elements carried by the carriage member 20, so that relative swinging movements may take place between the trailer and carriage members as the rig mount passes over rough terrain without damaging the draw-works or other devices supported by either trailer or carriage. The draw-works 38 is elevated by interposing the spacers 46 between the shackle links 43 and the undersides of trailer beams 35, substantially as shown in Fig. 6. The draw-works can now be operated from the power units 39, and, through the train of gearing, power can be taken off from the draw-works for rotating the drive wheels 25 to thereby move the rig mount to the next location where it is desired to drill or service a well. Such movements of the entire rig mount are preferably limited to relatively short hauls, though it is possible to move the rig mount for considerable distances over ordinary terrain, unless a natural obstacle, such as a river, or a man-made obstacle, such as a road whereon the rig mount is forbidden by law to roll, is encountered.

When it is desired to move the well equipment over relatively long distances, the derrick, draw-works, power units, etc., are removed from the carriage and trailer members. Then the cross braces 23 connecting the carriage beams 22 are dismantled, and the carriage member 20 is converted into a pair of towable units, substantially as shown in Figs. 10 and 11. The outrigger brackets 27 are swung outwardly, and the dismantled cross braces 23 are arranged on the outrigger brackets for convenient transportation in stacked relation. The entire trailer member is similarly dismantled and its parts deposited on and carried by the towable units of the carriage member during long hauls. The caster wheels 36 of the trailer need not be removed from the beams 35, but the trailer beams with the caster wheels still attached may be supported upon the towable units, substantially as shown in Figure 10.

In some cases it is possible to distribute the derrick angle irons and other component parts in dismantled stockpile relation upon the two towable units. By inserting posts 28 into the apertures in the free extremities of the outrigger bracket 27, a relatively high pile of dismantled derrick parts may be supported upon each towable unit. However, when the larger size derricks and associated elements are being transported over relatively long distances, it may be necessary to utilize additional transport trucks or the like.

The front wheels 24 may be utilized for steering the respective towable units, or suitable draw bar connections may be arranged between a towable unit and a tractor. Trucks may be employed as tractors for towing the units, and the draw works, power units, etc., carried upon such trucks during the long transport hauls.

When the long haul is completed, the carriage member 20 and trailer member 21 are reassembled, with the carriage beams 22 again forming the side members of the carriage with the cross braces 23 rearranged to assist in supporting the derrick, substructure, etc. Similarly the trailer is re-assembled and connected to the carriage through its shackle link connections enabling horizontal alignment between the hinge-points of the trailer and the drive shafts 47, whereby the rig mount may again be moved safely and flexibly by power from the draw works. The rig mount may then be moved to the exact position desired under its own power, and thereafter the legs 26 may be downswung to stationarily support the derrick and associated apparatus in such position.

While it is apparent that the illustrated embodiment herein described is well calculated to adequately fulfill the objects and advantages herein stated, it is to be understood that the invention is susceptible to variation and modification within the spirit and scope of the subjoined claims.

Having described my invention, I claim:

1. A portable rig mount having a carriage member, a trailer member arranged with its forward extremity in proximity to the carriage member, and hinge connections between said members comprising a plurality of laterally-spaced shackle links having their forward portions hinged upon the carriage member and their rear portions hingedly connected to the underside of the trailer member at a distance from its forward edge, the axes of the forward hinge-points connecting said shackle links to the carriage member being arranged in the same horizontal and vertical planes, and means for propelling the rig mount including traction elements supporting the rig mount on the ground, drive shafts journalled on the carriage member with their axes in the same horizontal and vertical planes as said forward hinge-points, and power-transmitting means operatively connecting the drive shafts and traction elements.

2. A portable rig mount having a carriage member, a trailer member arranged with its forward extremity in proximity to the carriage member, and hinge connections between said members comprising a plurality of laterally-spaced shackle links having their forward portions hinged upon the carriage member and their rear portions hingedly connected to the underside of the trailer member at a distance from its forward edge, the axes of the forward hinge-points connecting said shackle links to the carriage member being arranged in the same horizontal and vertical planes, drive wheels mounted on the carriage member at both sides of the forward portion of the trailer member, and means for propelling the rig mount including drive shafts journalled on the carriage member forwardly of the drive wheels and with their axes in the same horizontal and vertical planes as said forward hinge-points, and gearing connecting the drive shafts with said drive wheels.

3. A portable rig mount as recited in claim 1 wherein the trailer member is arranged to support a draw works for operating well equipment, and the rig mount is propelled from said draw works through a train of chain and sprocket gearing connected to rotate said drive shafts from said draw works at will.

4. The combination claimed in claim 2, including a draw works mounted on the trailer member and gearing connecting the draw works to the drive shafts.

OSCAR D. CALDWELL.

References Cited in the file of this patent

UNITED STATES PATENTS

| Number | Name | Date |
|---|---|---|
| 963,874 | Daimler | July 12, 1910 |
| 1,051,624 | Nilson et al. | Jan. 28, 1913 |
| 1,118,848 | Evans | Nov. 24, 1914 |
| 1,401,786 | Kapferer | Dec. 27, 1921 |
| 1,601,917 | Kinvall | Oct. 5, 1926 |
| 1,741,598 | Ackerman | Dec. 31, 1929 |
| 1,775,297 | Towner | Sept. 9, 1930 |
| 1,870,548 | Wittouck et al. | Aug. 9, 1932 |
| 2,344,383 | Alexander et al. | Mar. 14, 1944 |
| 2,354,922 | McEwen et al. | Aug. 1, 1944 |
| 2,464,525 | Nurney | Mar. 15, 1949 |

FOREIGN PATENTS

| Number | Country | Date |
|---|---|---|
| 245,254 | Switzerland | July 1, 1947 |
| 318,101 | Italy | June 2, 1934 |
| 734,062 | France | July 25, 1932 |
| 811,517 | France | Jan. 18, 1937 |